(No Model.)
F. REINHART & T. R. McDONALD.
CIRCULAR SAWING MACHINE.
No. 263,957. Patented Sept. 5, 1882.
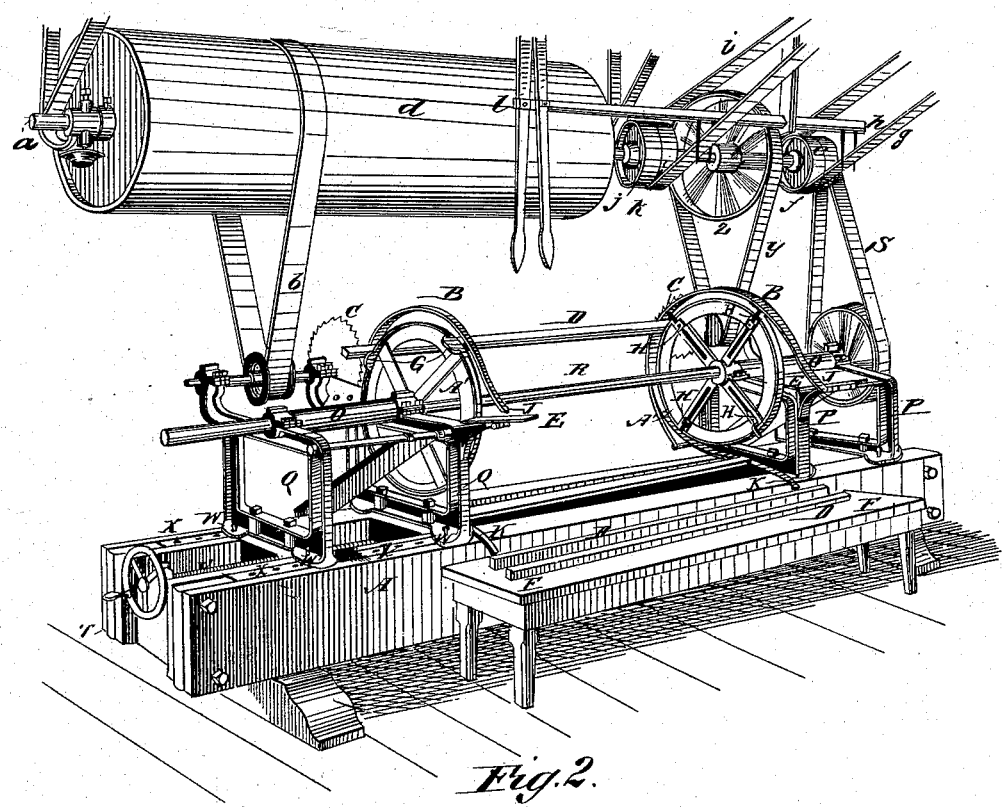
WITNESSES:
Francis McArdle.
C. Sedgwick
INVENTOR:
F. Reinhart
T. R. McDonald
BY Munn & Co
ATTORNEYS.

UNITED STATES PATENT OFFICE.

FLORIAN REINHART AND THEODORE R. McDONALD, OF TOLEDO, OHIO.

CIRCULAR SAWING MACHINE.

SPECIFICATION forming part of Letters Patent No. 263,957, dated September 5, 1882.

Application filed May 11, 1882. (No model.)

*To all whom it may concern:*

Be it known that we, FLORIAN REINHART and THEODORE R. McDONALD, both of Toledo, in the county of Lucas and State of Ohio, have invented a new and Improved Equalizing Sawing-Machine, of which the following is a full, clear, and exact description.

This invention consists of rotary feeders and saws for cutting off both ends of felly and shaft sticks for wagon-stock, also any other sticks to be equalized in length, the said rotary feeders being contrived and provided with means for taking the sticks up one by one on the faces of said feeders from a table whereon they are placed suitably for the purpose, carrying the sticks past the saws, by which said sticks are cut to the lengths required, and delivering them upon another table for removal, one of the said feed-wheels and saws being arranged for shifting toward and from the other feeder and saw for setting them to cut pieces of different lengths, all as hereinafter described, and pointed out in the claims.

Reference is to be had to the accompanying drawings, forming part of this specification, in which similar letters of reference indicate corresponding parts in both the figures.

Figure 1 is a perspective view of our improved sawing-machine, and Fig. 2 is a side view of one of the guides employed with the feed-wheels for confining the stuff to be sawed thereon.

A represents a bed-frame for supporting the machine, which consists essentially of the feed-wheels A', guides B, and saws C, by which the felly, shaft, or other wood bars D are to be taken up from the tables E, whereon they are placed by hand, carried around past the saws, cut to length thereby, and delivered onto the bench F to be removed. The feed-wheels A' are fitted with projecting dogs or fingers H, and the periphery of the wheels adjacent to fingers H may be widened by flanges G, to afford firmer bearing for the sticks on the wheels at that point. The fingers H pick up the sticks one at a time by rising against said sticks lying on the table E, so as to carry them along with the wheels under the guides, past the saws, and to the place of delivery. The guides consist of a steel spring, I, nearly encircling the wheel on a curvature a little larger than said wheel, with tangential point J, for the entry of the sticks, and the reversely-curved point K, for discharging them, and having the supporting-plate L extending back from point J partly around toward the discharging-point and to the attaching-bolts M N, where said plate is secured to the bed-frame in such relation to the spring and the feed-wheel that the said guide-spring I will act upon and properly guide successively following pieces, varying considerably in thickness. In this case the feed-wheels A' are provided with four fingers each for picking up and carrying the pieces along under the spring-guides, but they may have more or less, as preferred; and said fingers may be made adjustable radially upon the feed-wheels to set them out or in, according to the thickness of the sticks to be cut. The feed-wheels A' are mounted on sleeves O, having bearings in the head-stock P and tail-stock Q respectively, and a shaft, R, to which power is applied by belt S, passes through them to turn said wheels. The tail-stock Q is adjustable along the bed-frame A by a hand-wheel, T, and adjusting-screw V, for setting the machine for cutting sticks of different lengths, and the stock and the bed-frame have stop-pins W and pin-holes X, for securing the stock after setting it by the screw, so that it cannot shift, as it might in case the screw should be a little slack. The feed-wheel at the head-stock is keyed fast to the shaft R; but the one at the tail-stock is fixed with a feather or spline, allowing the stock to slide forward and backward and carry the feed-wheel and saw mounted thereon from one position to another, as required. The saws are respectively mounted on the head and tail stocks, and the one at the head is driven by the belt y from the pulley Z on the counter-shaft a. The other is driven by the belt b from the drum d, mounted on the counter-shaft, said drum being used to allow belt b to shift along with the saw. The fast and loose pulleys e f on shaft a are for driving the feed-wheels by the belt g, which is provided with a shifter, h, and the shaft a is turned by the belt i with fast and loose pulleys j k, said belt i also having a shifter, l.

Having thus fully described our invention, what we claim as new, and desire to secure by Letters Patent, is—

1. The combination, with the drum $d$ on the counter-shaft $a$, and sliding belt $b$, of the adjustable tail-stock Q, carrying the saw C, the feed-wheel A', and the guide B, substantially as and for the purpose set forth.

2. The guides B, having tangential point J and reversely-bent point K, in combination with feed-wheel A', substantially as described.

3. The guide B, consisting of curved spring I, with points J K and back plate, L, in combination with feed-wheel A', substantially as described.

FLORIAN REINHART.
THEODORE R. McDONALD.

Witnesses:
J. W. CALDWELL,
MARY McGILL.